(12) United States Patent
Tanaka et al.

(10) Patent No.: US 9,727,007 B2
(45) Date of Patent: Aug. 8, 2017

(54) ROTARY DEVICE AND IMAGE FORMING APPARATUS

(71) Applicant: FUJI XEROX CO., LTD., Tokyo (JP)

(72) Inventors: Mihoko Tanaka, Kanagawa (JP); Kazuyoshi Hagiwara, Kanagawa (JP); Yusuke Sakai, Kanagawa (JP); Akira Takahashi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/082,310

(22) Filed: Mar. 28, 2016

(65) Prior Publication Data

US 2017/0131661 A1    May 11, 2017

(30) Foreign Application Priority Data

Nov. 5, 2015   (JP) .................................. 2015-217297

(51) Int. Cl.
    *G03G 21/08*   (2006.01)
    *G03G 15/01*   (2006.01)
    *G03G 15/16*   (2006.01)
    *F16F 15/30*   (2006.01)

(52) U.S. Cl.
    CPC ......... *G03G 15/1615* (2013.01); *F16F 15/30* (2013.01)

(58) Field of Classification Search
    CPC .............................. G03G 15/1615; F16F 15/30
    See application file for complete search history.

(56) References Cited

U.S. PATENT DOCUMENTS

| 4,244,240 | A | * | 1/1981 | Rabenhorst | F16D 3/76 416/134 R |
|---|---|---|---|---|---|
| 6,456,807 | B1 | * | 9/2002 | Makino | F16F 1/3732 399/167 |
| 8,290,403 | B2 | * | 10/2012 | Ueno | G03G 15/757 101/38.1 |
| 2012/0308267 | A1 | * | 12/2012 | Oomoto | G03G 15/757 399/167 |

FOREIGN PATENT DOCUMENTS

| JP | H10-319786 A | 12/1998 |
|---|---|---|
| JP | H11-119593 A | 4/1999 |

* cited by examiner

*Primary Examiner* — Francis Gray
(74) *Attorney, Agent, or Firm* — Oliff PLC

(57) ABSTRACT

A rotary device includes a rotary shaft, a rotary body that is supported by the rotary shaft, and rotates about the rotary shaft, and at least one plate-like member having a central point that serves as a center of rotation when the plate-like member rotates, the plate-like member having an outer peripheral portion, the plate-like member including at least one cutout formed by cutting out the outer peripheral portion of the plate-like member at positions that are symmetric with respect to a straight line passing through the central point, the plate-like member being secured to the rotary shaft to rotate together with the rotary body as the rotary shaft rotates.

4 Claims, 5 Drawing Sheets

ROTARY DEVICE AND IMAGE FORMING APPARATUS

CROSS-REFERENCE TO RELATED APPLICATIONS

This application is based on and claims priority under 35 USC 119 from Japanese Patent Application No. 2015-217297 filed Nov. 5, 2015.

BACKGROUND

Technical Field

The present invention relates to a rotary device and an image forming apparatus.

SUMMARY

According to an aspect of the invention, there is provided a rotary device including a rotary shaft, a rotary body that is supported by the rotary shaft, and rotates about the rotary shaft, and at least one plate-like member having a central point that serves as a center of rotation when the plate-like member rotates, the plate-like member having an outer peripheral portion, the plate-like member including at least one cutout formed by cutting out the outer peripheral portion of the plate-like member at positions that are symmetric with respect to a straight line passing through the central point, the plate-like member being secured to the rotary shaft to rotate together with the rotary body as the rotary shaft rotates.

BRIEF DESCRIPTION OF THE DRAWINGS

Exemplary embodiment of the present invention will be described in detail based on the following figures, wherein.

DETAILED DESCRIPTION

Next, the present invention will be described in further detail with reference to the figures by way of its exemplary embodiment and specific examples. However, the present invention is not limited to the exemplary embodiment and specific examples.

It is to be noted that in the following description made with reference to the figures, the figures are for illustrative purposes only, and details such as the relative ratios of various dimensions may differ from the actuality. For the ease of understanding, components other than those required for explanation are not illustrated as appropriate.

Figure 1:
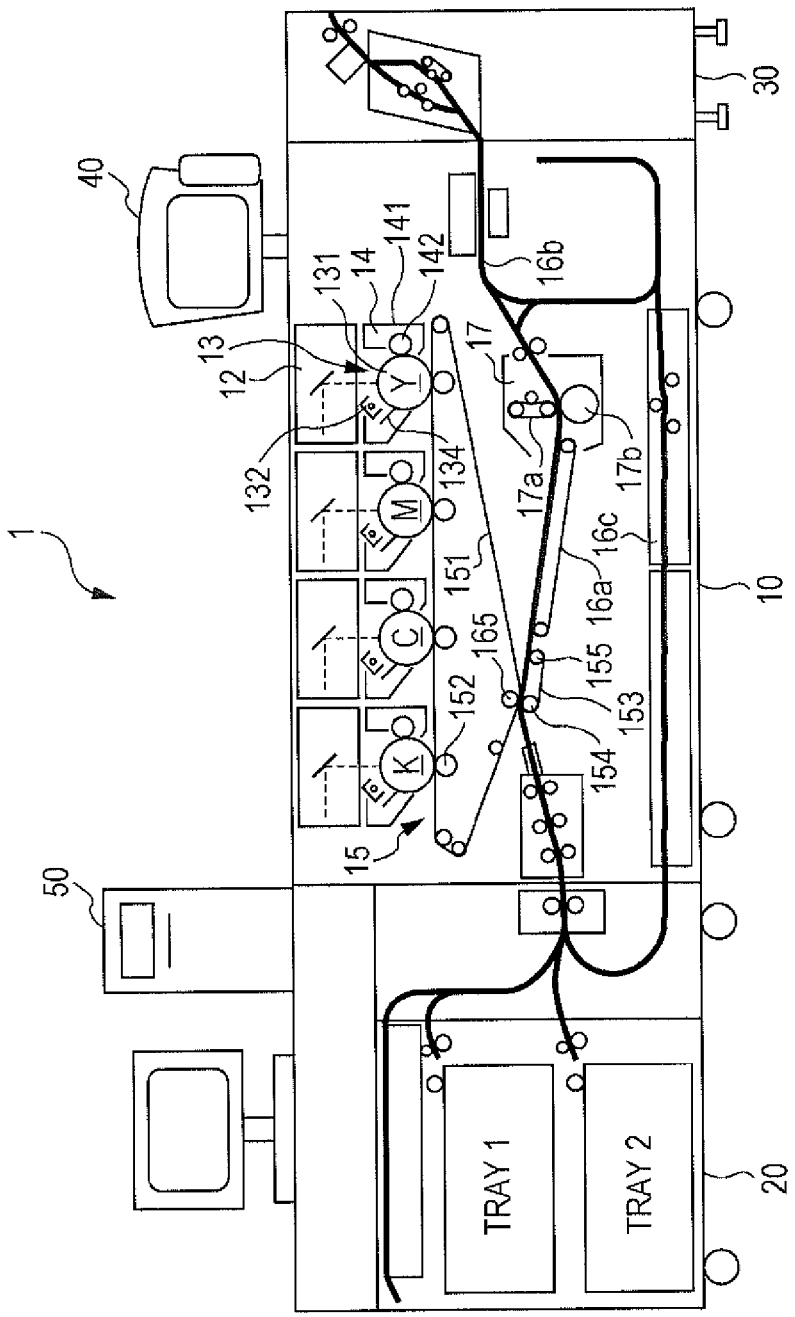
FIG. 1 is a schematic cross-sectional view illustrating the general configuration of an image forming apparatus according to an exemplary embodiment.

(1) Overall Configuration and Operation of Image Forming Apparatus (1.1) Overall Configuration of Image Forming Apparatus FIG. 1 is a schematic cross-sectional view illustrating the general configuration of an image forming apparatus 1 according to an exemplary embodiment.

The image forming apparatus 1 includes an image forming unit 10, a paper feed device 20 attached to one end of the image forming unit 10, a sheet discharge unit 30 disposed at the other end of the image forming unit 10 to discharge a sheet that has been printed, an operational information unit 40, and an image processing unit 50 that generates image information from print information transmitted from a host apparatus.

The image forming unit 10 includes a system controller 11 (not illustrated), exposure devices 12, photoconductor units 13, developing devices 14, a transfer device 15, sheet transport devices 16a, 16b, and 16c, a fixing device 17, and a driver 18 (not illustrated). The image forming unit 10 receives image information from the image processing unit 50, and based on the image information, the image forming unit 10 forms a toner image on a sheet P of paper fed from the paper feed device 20.

The paper feed device 20 supplies a sheet to the image forming unit 10. That is, the paper feed device 20 includes multiple paper loading units to receive sheets P that differ in type (for example, material, thickness, paper size, and paper grain). The paper feed device 20 supplies a sheet P sent out from one of the multiple paper loading units to the image forming unit 10.

The sheet discharge unit 30 discharges a sheet P on which an image has been formed in the image forming unit 10. Thus, the sheet discharge unit 30 includes a discharged-sheet receiving unit to receive a discharged sheet P on which an image has been formed. The sheet discharge unit 30 may have the function of performing post-processing such as cutting or stapling on a bundle of sheets output from the image forming unit 10.

The operational information unit 40 is used to make various settings, input instructions, and display information. That is, the operational information unit 40 corresponds to a so-called user interface. Specifically, the operational information unit 40 is made up of a combination of a liquid crystal display panel, various operating buttons, a touch panel, and other components.

(1.2) Configuration and Operation of Image Forming Unit

In the image forming apparatus 1 described above, a sheet P sent out from a paper loading unit of the paper feed device 20 that is specified by a print job for each single sheet to be printed, is fed to the image forming unit 10 in synchronism with the timing of image formation.

The photoconductor units 13, which are an example of a process unit, are disposed in parallel below the corresponding exposure devices 12. Each of the photoconductor units 13 includes a photoconductor drum 131, which is an image carrier that is rotationally driven. A charger 132, the exposure device 12, the developing device 14, a first transfer roller 152, and a cleaning blade 134 are disposed in the direction of rotation of the photoconductor drum 131.

The developing device 14 has a developing housing 141 in which a developer is received. A developing roller 142, which is opposed to the photoconductor drum 131, is disposed inside the developing housing 141. A layer regulating member (not illustrated) that regulates the layer thickness of developer is disposed in close proximity to the developing roller 142.

Each of the developing devices 14 is of substantially the same configuration except for the developer received in the corresponding developing housing 141. Each of the developing devices 14 forms a toner image of yellow (Y), magenta (M), cyan (C), or black (K).

As the photoconductor drum 131 rotates, its surface is charged by the charger 132, and an electrostatic latent image is formed on the surface of the photoconductor drum 131 by latent image-forming light emitted from the exposure device 12. The electrostatic latent image formed on the photoconductor drum 131 is developed as a toner image by the developing roller 142.

The transfer device 15 includes an intermediate transfer belt 151, the first transfer roller 152, and a second transfer belt 153. The intermediate transfer belt 151 is an endless member to which toner images of various colors formed on the photoconductor drums 131 of the photoconductor units 13 are transferred in a superimposed manner. The first transfer roller 152 sequentially transfers the toner images of various colors formed in the photoconductor units 13 to the intermediate transfer belt 151 (first transfer). The second transfer belt 153 transfers toner images of various colors transferred onto the intermediate transfer belt 151 in a superimposed manner, to a sheet that is a recording medium at once (second transfer).

The second transfer belt 153 is stretched under tension between a second transfer roller 154 and a stripping roller 155. The second transfer belt 153 is sandwiched between a backup roller 165 disposed on the back side of the intermediate transfer belt 151, and the second transfer roller 154, forming a second transfer part (TR).

Toner images of various colors formed on the photoconductor drums 131 of the photoconductor units 13 are sequentially electrostatically transferred (first transfer) onto the intermediate transfer belt 151 by the first transfer roller 152 that is being applied with a predetermined transfer voltage from a power supply device (not illustrated) controlled by the system controller 11. This first transfer forms superimposed toner images with various colors of toner superimposed on each other.

As the intermediate transfer belt 151 circulates, the superimposed toner images on the intermediate transfer belt 151 are transported to the second transfer part TR where the second transfer belt 153 is disposed. Once the superimposed toner images are transported to the second transfer part TR, a sheet P is supplied to the second transfer part TR from the paper feed device 20 in synchronism with this timing. Then, a predetermined transfer voltage is applied to the backup roller 165, which is opposed to the second transfer roller 154 with the second transfer belt 153 therebetween, from the power supply device or other devices controlled by the system controller 11. This causes the superimposed toner images on the intermediate transfer belt 151 to be transferred to the sheet P at once.

Residual toner on the surface of the photoconductor drum 131 is removed by the cleaning blade 134, and collected in a waste-toner receiving unit (not illustrated). The surface of the photoconductor drum 131 is charged by the charger 132 again.

The fixing device 17 includes a fixing belt 17*a* in an endless form that rotates in one direction, and a pressure roller 17*b* that contacts the peripheral surface of the fixing belt 17*a* and rotates in one direction. The press contact region between the fixing belt 17*a* and the pressure roller 17*b* forms a nip part (fixing region).

After a toner image is transferred to the sheet P in the transfer device 15, the sheet P is transported to the fixing device 17 via the sheet transport device 16*a*. In this state, the toner image has not been fixed onto the sheet P yet. The toner image is then fixed onto the sheet P transported to the fixing device 17 with pressure and heat applied by the pair of the fixing belt 17*a* and the pressure roller 17*b*.

The sheet P with the fixed toner image is fed to the sheet discharge unit 30 via the sheet transport device 16*b*.

When an image is to be formed on both sides of the sheet P, the front and back sides of the sheet P are reversed by the sheet transport device 16*c*, and then the sheet P is fed to the second transfer part TR of the image forming unit 10 again. Then, after a toner image is transferred and the transferred image is fixed onto the sheet P, the sheet P is fed to the sheet discharge unit 30. The sheet P fed to the sheet discharge unit 30 undergoes post-processing such as cutting or stapling as required, before being discharged to the discharged-sheet receiving unit.

Figure 2:
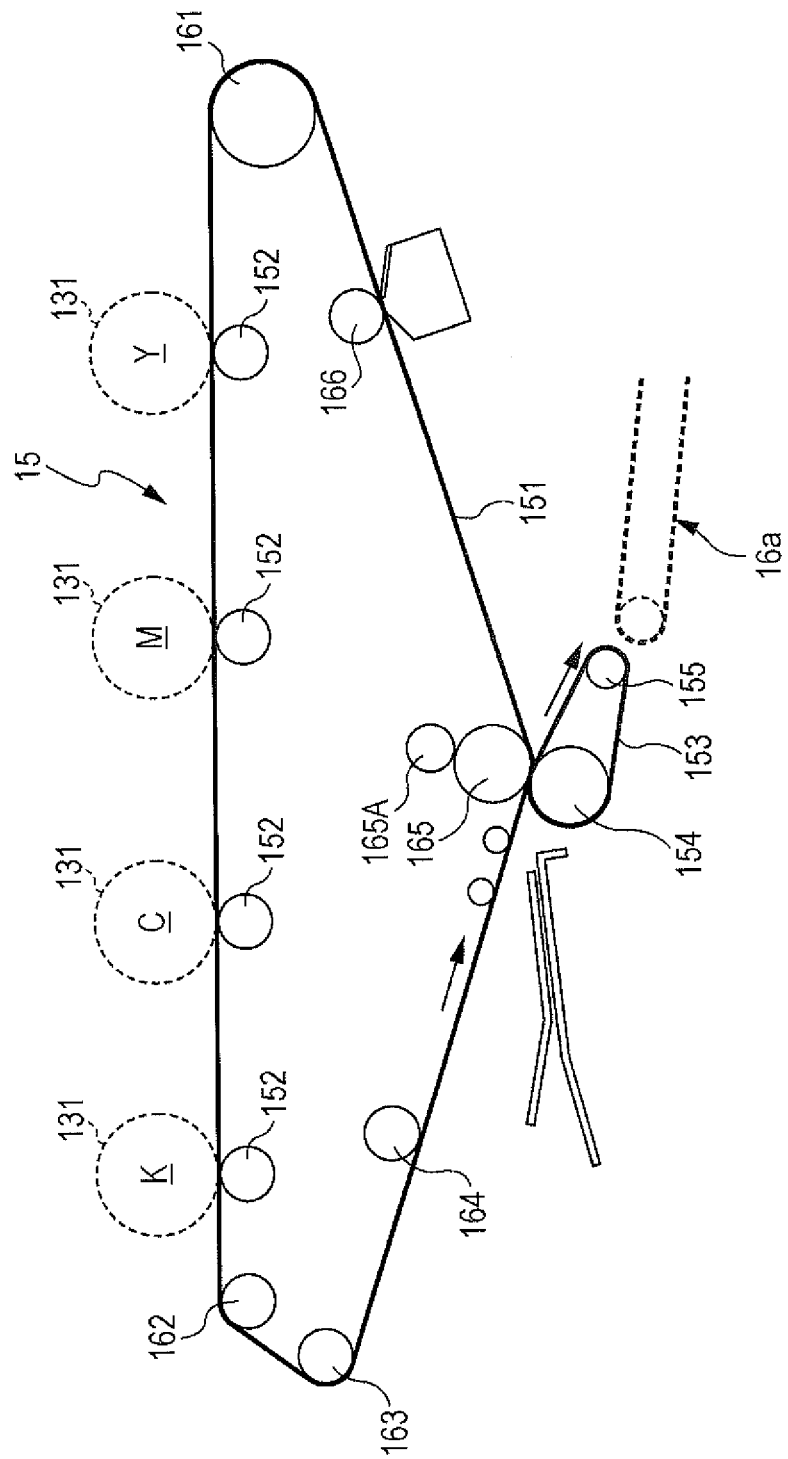
FIG. 2 is a schematic cross-sectional view illustrating the configuration of a transfer device of an image forming apparatus.
Figure 3A:
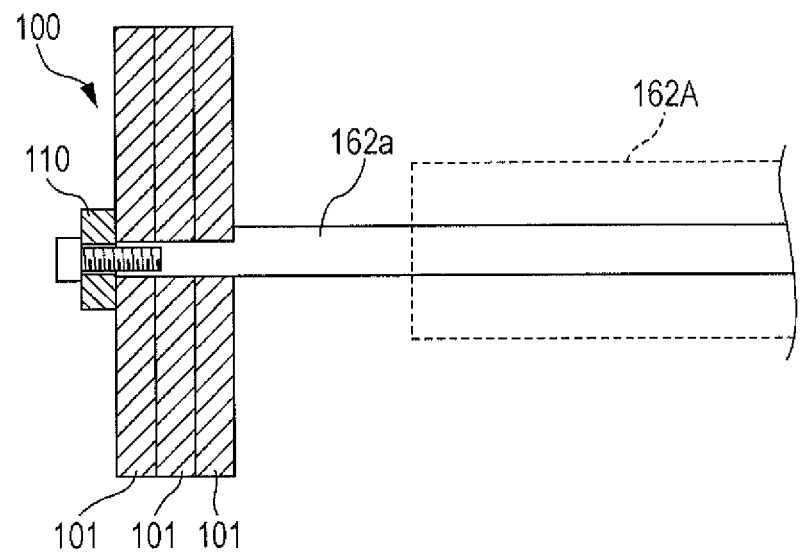
FIG. 3A is a schematic cross-sectional view of an end portion of a driven roller to which a flywheel is attached.
Figure 3B:
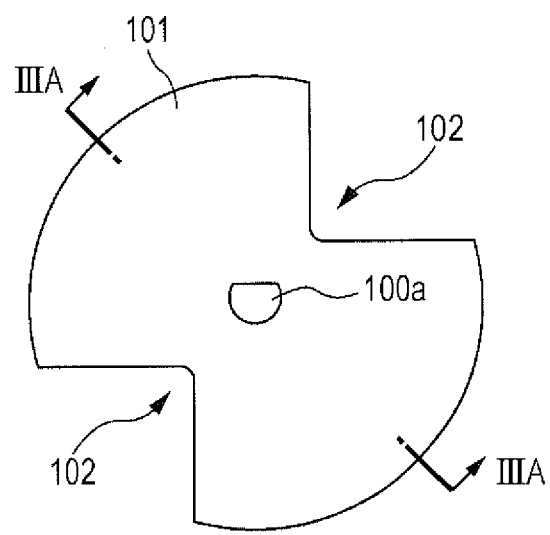
FIG. 3B is a front view of a flywheel.
Figure 4A:
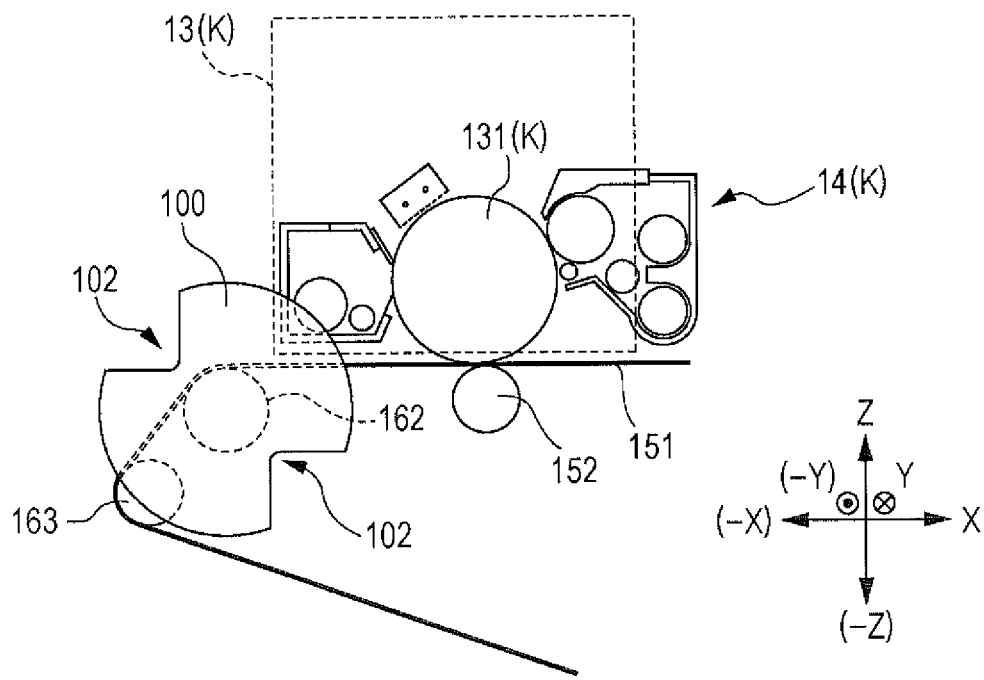
FIG. 4A is a front view illustrating overlapping of a photoconductor unit and a flywheel.
Figure 4B:
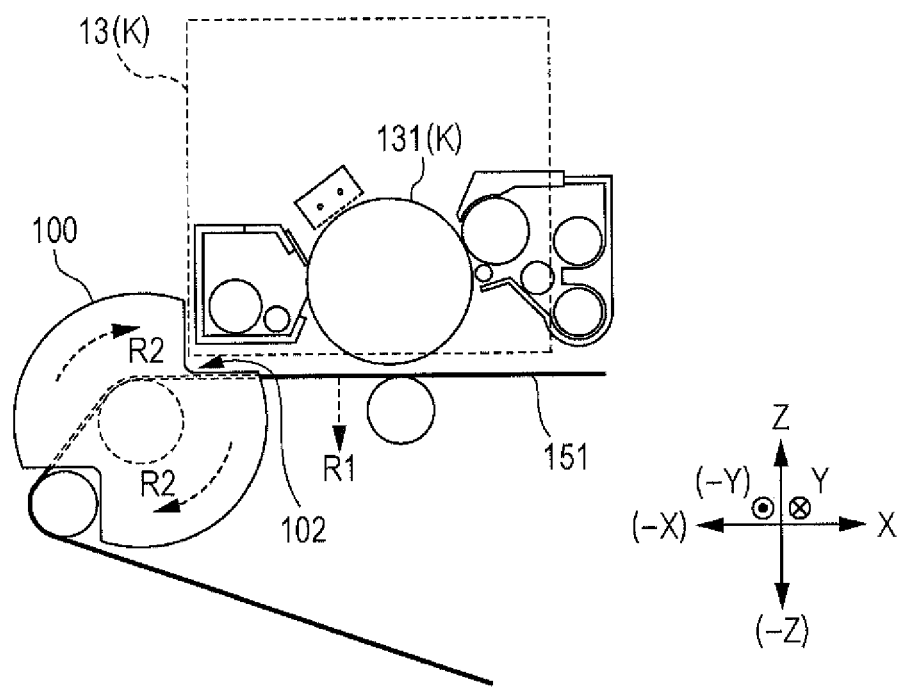
FIG. 4B is a front view illustrating insertion and removal of a photoconductor unit.
Figure 5A:
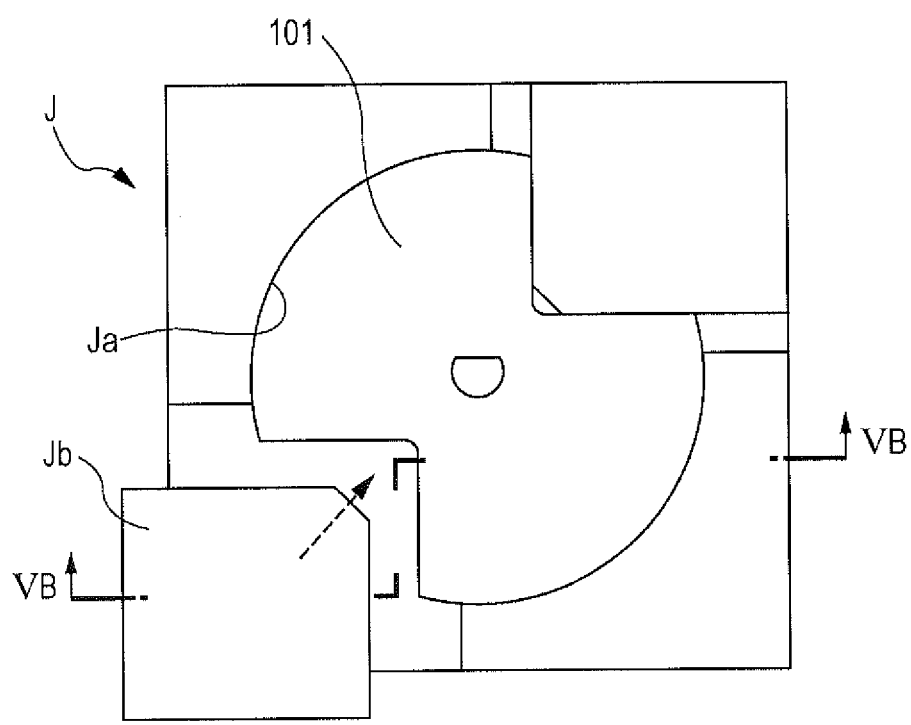
FIG. 5A is a schematic plan view of a positioning jig for a flywheel.
Figure 5B:
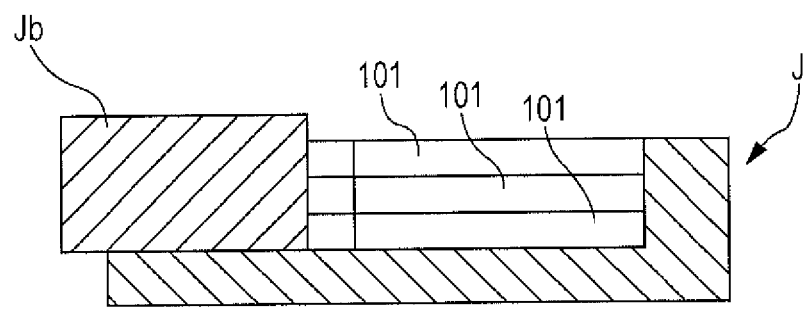
FIG. 5B is a schematic cross-sectional plan view of a positioning jig for a flywheel.

(2) Configuration and Operation of Transfer Device (2.1) Configuration of Transfer device FIG. 2 is a schematic cross-sectional view illustrating the configuration of the transfer device 15 of the image forming apparatus 1 according to the exemplary embodiment. FIG. 3A is a schematic cross-sectional view of an end portion of a driven roller 162 to which a flywheel 100 is attached. FIG. 3B is a front view of the flywheel 100. FIG. 4A is a front view illustrating overlapping of the photoconductor unit 13 and the flywheel 100. FIG. 4B is a front view illustrating insertion and removal of the photoconductor unit 13. FIGS. 5A and 5B schematically illustrate a positioning jig for the flywheel 100.

The transfer device 15 includes the intermediate transfer belt 151, the first transfer roller 152, and the second transfer belt 153.

The intermediate transfer belt 151 has a driving roller 161, the driven roller 162, a tension roller 163, a support roller 164, the backup roller 165, and a cleaning backup roller 166. The driving roller 161 drives the intermediate transfer belt 151 so that the intermediate transfer belt 151 circulates. The driven roller 162 supports the intermediate transfer belt 151 that extends substantially linearly in the direction of arrangement of the photoconductor drums 131. The tension roller 163 applies a predetermined tension to the intermediate transfer belt 151, and prevents meandering of the intermediate transfer belt 151. The support roller 164, which is disposed upstream of the second transfer part TR, supports the intermediate transfer belt 151. The backup roller 165 is disposed in the second transfer part TR. The cleaning backup roller 166 is disposed in a cleaning part that scrapes off residual toner on the intermediate transfer belt 151.

(2.2) Rotary Device

As illustrated in FIG. 3A, the driven roller 162 has a rotary shaft 162*a*, the flywheel 100, and a securing member 110. The rotary shaft 162*a* is disposed at the center of rotation of a driven roller body 162A, which is an example of a rotary body. The flywheel 100, which is an example of a plate-like member, is disposed at one end of the rotary shaft 162*a* coaxially with the rotary shaft 162*a*. The securing member 110 secures the flywheel 100 to the rotary shaft 162*a*.

The flywheel 100 is, for example, a cylindrical body made up of a stack of disc members 101 made of iron or stainless steel (SUS). The flywheel 100, which is disposed around the rotary shaft 162*a*, is secured to the rotary shaft 162*a*. The tension on the intermediate transfer belt 151 is subject to variations due to the impact caused when, for example, heavy paper, which is to be nipped in the second transfer part TR, enters the second transfer part TR. Such variations in tension are typically reduced by providing sufficient friction between the driven roller 162 and the inner surface of the intermediate transfer belt 151.

Specifically, to attain sufficient friction for cancelling variations in tension, the driven roller 162 desirably has a small roller diameter and a large rotational inertia. Accordingly, the diameter of the driven roller 162 used is made as small as possible, and the flywheel 100 that gives sufficient moment of inertia is attached to an end portion of the driven roller 162, thus absorbing variations in tension. The flywheel 100 increases the moment of inertia with respect to the rotary shaft 162a to reduce variations in the rotational speed (irregularity of rotation) of the driven roller 162.

In the exemplary embodiment, the flywheel 100 has cutouts 102 formed by cutting out the outer peripheral portion of the flywheel 100 at positions that are symmetric with respect to a straight line L passing through a central point 100a as illustrated in FIG. 3B.

The cutouts 102 are located within such an area that when the photoconductor unit 13, which is an example of a consumable item inserted into or removed from the body of the image forming apparatus 1, is inserted or removed in a direction (Y-direction) crossing (perpendicular to) the direction in which the intermediate transfer belt 151 circulates with the flywheel 100 secured to one end of the rotary shaft 162a of the driven roller 162, a part of the photoconductor unit 13 does not come into unwanted contact with the flywheel 100 along the path of its movement. In the exemplary embodiment, the photoconductor unit 13 in this case corresponds to the photoconductor unit 13(K) for black (K) located closest to the driven roller 162.

In some cases, while operation of the image forming apparatus 1 is stopped, the outer peripheral portion of the flywheel 100 secured at one end of the rotary shaft 162a of the driven roller 162 overlaps a part of the photoconductor unit 13(K) in front view as illustrated in FIG. 4A.

Accordingly, the photoconductor unit 13(K) is inserted or removed as illustrated in FIG. 4B. That is, with the the intermediate transfer belt 151 moved downward away from the photoconductor unit 13(K) (see arrow R1 in FIG. 4B), the flywheel 100 is rotated until one of the cutouts 102 is at a position that coincides with the path of insertion or removal of the photoconductor unit 13(K) (see arrow R2 in FIG. 4B), and an area of the photoconductor unit 13(K) that comes into unwanted contact with the flywheel 100 is passed through the cutout 102, thus allowing insertion or removal of the photoconductor unit 13(K).

Since the cutouts 102 are located at two positions that are symmetric with respect to the straight line L passing through the central point 100a, the eccentricity of the weight of the flywheel 100 is distributed in space without becoming concentrated in any one area, allowing the inertial force acting during rotation to be evenly distributed.

Multiple disc members 101 having the cutouts 102 at positions that are symmetric with respect to the straight line L passing through the central point 100a are all formed in the same dimensions and shape by stamping, for example, and then the disc members 101 are stacked together. In that state, the disc members 101 are secured to each other by means of, for example, welding, adhesion with an adhesive, or caulking. Thus, the disc members 101 are formed as an integral component.

When the multiple disc members 101 of the same dimensions and shape stacked together with their respective cutouts 102 aligned are to be secured to each other, a positioning jig illustrated in FIGS. 5A and 5B is used to perform positioning.

Specifically, a positioning jig J illustrated in FIGS. 5A and 5B, the disc member 101 has a through-hole Ja with the same diameter as the outside diameter (a diameter 2R) of the disc member 101. The inner wall of the through-hole Ja regulates the position of the outer peripheral edges (outer radial portion) of the disc member 101 having an arcuate shape.

With the position of the outer peripheral edges of the disc members 101 regulated in this way, a rectangular block body Jb is moved to a position that coincides with the cutouts 102, and secured in place such as by being held against an inner wall 102a of the cutouts 102 (as indicated by an arrow in FIG. 5A), thus allowing accurate positioning of the cutouts 102 of the disc members 101.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A rotary device comprising:
   a rotary shaft;
   a rotary body that is supported by the rotary shaft, and rotates about the rotary shaft; and
   at least one plate-like member having a central point that serves as a center of rotation when the plate-like member rotates, the plate-like member having an outer peripheral portion, the plate-like member including at least one cutout formed by cutting out the outer peripheral portion of the plate-like member at positions that are symmetric with respect to a straight line passing through the central point, the plate-like member being secured to the rotary shaft to rotate together with the rotary body as the rotary shaft rotates, wherein
   the at least one plate-like member comprises a plurality of plate-like members, the plate-like members being all identical in dimensions and shape and stacked together with the respective cutouts of the plate-like members aligned with each other.

2. An image forming apparatus comprising:
   a main body;
   a consumable item that is consumed as an image is formed, the consumable item being inserted into or removed from the main body of the image forming apparatus; and
   an endless member having an outer peripheral surface, the endless member being stretched under tension between a plurality of rollers including a rotary device to transport a toner image while holding the toner image on the outer peripheral surface, the rotary device comprising
   a rotary shaft,
   a rotary body that is supported by the rotary shaft, and rotates about the rotary shaft, and at least one plate-like member having a central point that serves as a center of rotation when the plate-like member rotates, the plate-like member having an outer peripheral portion, the plate-like member including at least one cutout formed by cutting out the outer peripheral portion of the plate-like member at positions that are symmetric with respect to a straight line passing through the central point, the plate-like member being secured to the rotary shaft to rotate together with the rotary body as the rotary shaft rotates, wherein the at least one cutout comprises a plurality of cutouts, and when the consumable item is to be inserted or removed in a direction that crosses a direction of transport of the endless member, the consumable item is inserted or removed by passing the consumable item through one of the cutouts.

3. The image forming apparatus according to claim 2, wherein the consumable item comprises a process unit including an image carrier that carries the toner image.

4. An image forming apparatus comprising:

a main body;

a consumable item that is consumed as an image is formed, the consumable item being inserted into or removed from the main body of the image forming apparatus; and an endless member having an outer peripheral surface, the endless member being stretched under tension between a plurality of rollers including the rotary device according to claim 2 to transport a toner image while holding the toner image on the outer peripheral surface, wherein the at least one cutout comprises a plurality of cutouts, and when the consumable item is to be inserted or removed in a direction that crosses a direction of transport of the endless member, the consumable item is inserted or removed by passing the consumable item through one of the cutouts.

\* \* \* \* \*